United States Patent
Butwin et al.

(10) Patent No.: US 6,170,506 B1
(45) Date of Patent: Jan. 9, 2001

(54) METHOD AND CIRCUIT FOR ACTIVELY CLEANING ELECTROHYDRAULIC VALVES IN A HYDRAULIC CONTROL VALVE CIRCUIT

(75) Inventors: John Butwin, Ann Arbor; Michael J. Monaghan, Royal Oak; Maria Eugenia Protopapas, Canton; Robert Cary Haase, Southfield; Stephen Michael Cicala, Dearborn Heights; Wolfgang Wickler, Farmington Hills, all of MI (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/246,519

(22) Filed: Feb. 8, 1999

(51) Int. Cl.[7] .............................. F16K 31/02; H01F 7/18
(52) U.S. Cl. ...................... 137/2; 137/15.06; 137/238; 251/129.05; 251/129.08; 318/632; 318/701; 361/146
(58) Field of Search ...................... 137/238, 240, 137/2, 15.01, 15.04, 15.05, 15.06; 251/129.05, 129.08; 318/632, 701; 361/139, 143, 146

(56) References Cited

U.S. PATENT DOCUMENTS

| | | | |
|---|---|---|---|
| 4,017,056 | * | 4/1977 | Schwalenstocker et al. ... 251/129.08 |
| 4,103,695 | * | 8/1978 | Aono ............................... 251/129.08 |
| 4,313,465 | * | 2/1982 | Holzem ........................... 251/129.05 |
| 4,345,737 | * | 8/1982 | Kawai et al. ................... 251/129.08 |
| 4,373,697 | * | 2/1983 | Phelps ............................. 251/129.08 |
| 4,386,626 | * | 6/1983 | Hehl ................................ 251/129.08 |
| 4,577,143 | | 3/1986 | Eschrich et al. . |
| 4,766,921 | * | 8/1988 | Williams ........................ 251/129.08 |
| 4,796,661 | * | 1/1989 | Hishinuma et al. ............ 251/129.08 |
| 4,974,622 | * | 12/1990 | Rader .............................. 251/129.05 |
| 5,202,813 | * | 4/1993 | Uota et al. ...................... 251/129.05 |
| 5,422,556 | * | 6/1995 | Graf et al. ............................ 318/701 |

FOREIGN PATENT DOCUMENTS

0055518 * 7/1982 (EP) ................................ 251/129.08

* cited by examiner

Primary Examiner—George L. Walton
(74) Attorney, Agent, or Firm—Frank G. McKenzie (57) ABSTRACT

A method for cleaning a solenoid-operated regulator valve wherein command current applied to a solenoid actuator establishes a defined response of a valve. Cleaning current pulses applied to the solenoid establish a response that does not interfere with the effectiveness of the valve function. The pulse width, pulse amplitude, pulse direction and pulse period are determined by the degree of contamination of the valve environment.

6 Claims, 6 Drawing Sheets

METHOD AND CIRCUIT FOR ACTIVELY CLEANING ELECTROHYDRAULIC VALVES IN A HYDRAULIC CONTROL VALVE CIRCUIT

TECHNICAL FIELD

A control valve capable of providing a regulated pressure in a valve system wherein provision is made for purging the valve of oil-borne contaminants.

BACKGROUND OF THE INVENTION

Electrohydraulic valve systems typically include a pressure regulator that responds to electromagnetic forces to position a valve element against a valve spring force. In the case of a pressure regulator valve, the output pressure is determined by a transfer function for the electrical parameter (e.g., magnetizing current) and the mechanical force applied to the valve. Valve systems of this kind typically are characterized by a hysteresis due to the effect of friction caused by oil-borne contaminants and the magnetic hysteresis of the electromagnetic actuator. A major factor in determining the frictional hysteresis is the presence of oil-borne contaminants in the hydraulic fluid.

Hysteresis in the transfer function results in a variable output pressure for any given actuating current. For an electrohydraulic valve with a proportional transfer function, the output pressure obtained when the actuating current increases is less than the output pressure obtained for the same current when the current decreases. The output value for the pressure thus is not precisely proportional to a given input parameter or magnetizing current. The opposite is true for an inversely proportional electrohydraulic valve.

U.S. Pat. No. 4,577,143 describes an attempt to establish a more precise control of the position of a regulator valve for a given value of an input parameter so that a predictable characteristic transfer curve at any value for the input parameter can be determined. This is accomplished in the system described in the '143 patent by changing the current in a direction that is opposite to the direction of the transfer function curve. This effects a reversal of the magnetization to overcome the hysteresis gap between the magnetization curves. The reversal of the magnetization occurs only when a change in command is requested.

Electrical energy is applied only long enough to effect re-magnetization. The transduced value, which is in the same direction as the selected characteristic, will follow the selected magnetization curve. The excess current value is not applied long enough to cause a change in the mechanical output of the valve.

DISCLOSURE OF INVENTION

The invention is a method and a circuit for purging oil-borne contaminants from a hydraulic regulator valve to reduce or to eliminate the effect of friction caused by the contaminants. Current supplied to the electromagnetic actuator for the valve varies in accordance with a transfer function to develop a regulated output pressure. The transfer function characteristics of the electrohydraulic valve, when the effect of contamination in the hydraulic fluid is eliminated, is relatively uniform when the magnetizing current at the solenoid actuator progressively increases. When the magnetizing current progressively decreases, the mechanical friction element of hysteresis that generally characterizes electrohydraulic valve mechanisms of known construction is eliminated. A given magnetizing current applied to the electromagnetic actuator will develop a predictable and calibratable mechanical response of the valve.

The effect of hysteresis and inaccuracies due to contamination can further be reduced by utilizing a dither frequency on the applied current.

Precise proportionality between the magnetizing current and the output pressure throughout the entire extent of the characteristic transfer function can be achieved. This predictable mechanical response of the valve to changes in the magnetizing current is obtained by applying command pulses of short duration at a predetermined points in the operating cycle. The pulse width, the amplitude of the pulse, the direction of the pulse, and the spacing between successive pulses, if more than one pulse is required, are empirically determined from transfer function results that indicate robust performance in the presence of the expected level of contamination.

Provision is made for reducing to a minimum the amplitude of the pulses in order to avoid an undesirable loss of output pressure for the regulator valve, which could lead to a loss of torque capacity in instances in which the regulated pressure is used to engage a clutch or a brake. Unlike the valve system of the '143 patent, where the re-magnetization occurs only when a change in command is requested, the cleaning pulses of the present invention occur during steady-state conditions.

The invention includes a driver circuit that is flexible for purposes of calibration and is programmable for various solenoid valve systems. Bidirectional pulses or unidirectional pulses can be used, depending on output pressure commands relative to a threshold value. The pulses, when the electrohydraulic valve is calibrated, will provide a precise mechanical movement without excessive pressure change in the controlled element such as a transmission clutch or brake.

BEST MODE FOR CARRYING OUT THE INVENTION

Figure 1:
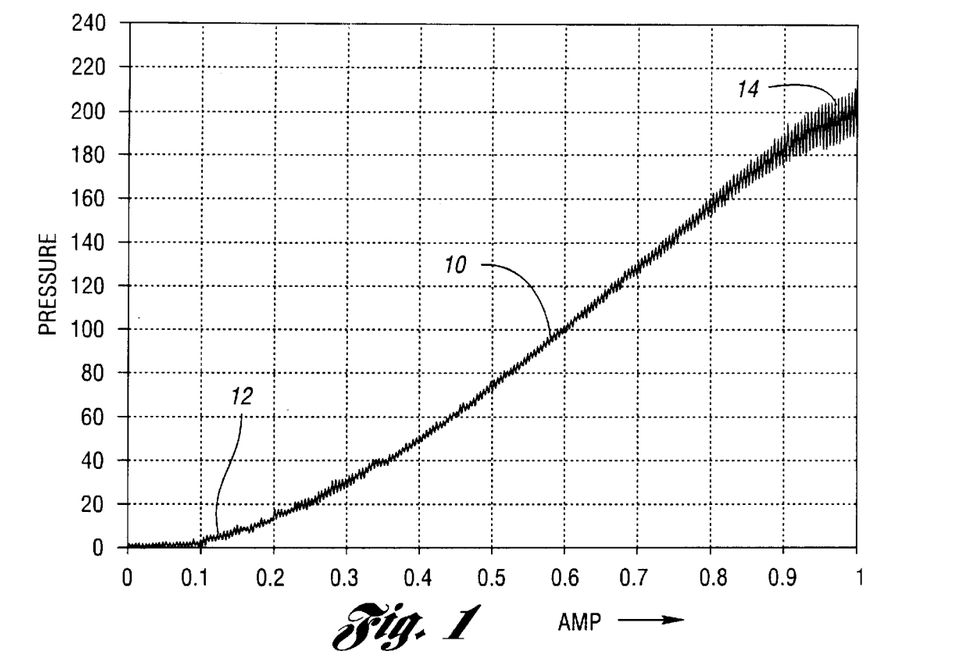
FIG. 1 shows a typical transfer function for an electrohydraulic valve when the valve is in a clean oil environment.

A typical transfer function for an electrohydraulic regulator valve is shown in FIG. 1. FIG. 1 is a plot with current on the abscissa and output pressure of a regulator valve on the ordinate. The transfer function at the intermediate region is generally linear, as shown at 10. The slope of the transfer function is low at low currents, as shown at 12, and it deviates from its linearity at high values of current, as shown at 14. Superimposed on the transfer function curve is a so-called high frequency, low amplitude dither value throughout the entire current range.

The transfer function of FIG. 1 is typical of a transfer function that would be characteristic of the operation of an electrohydraulic regulator valve in clean oil.

Figure 2:
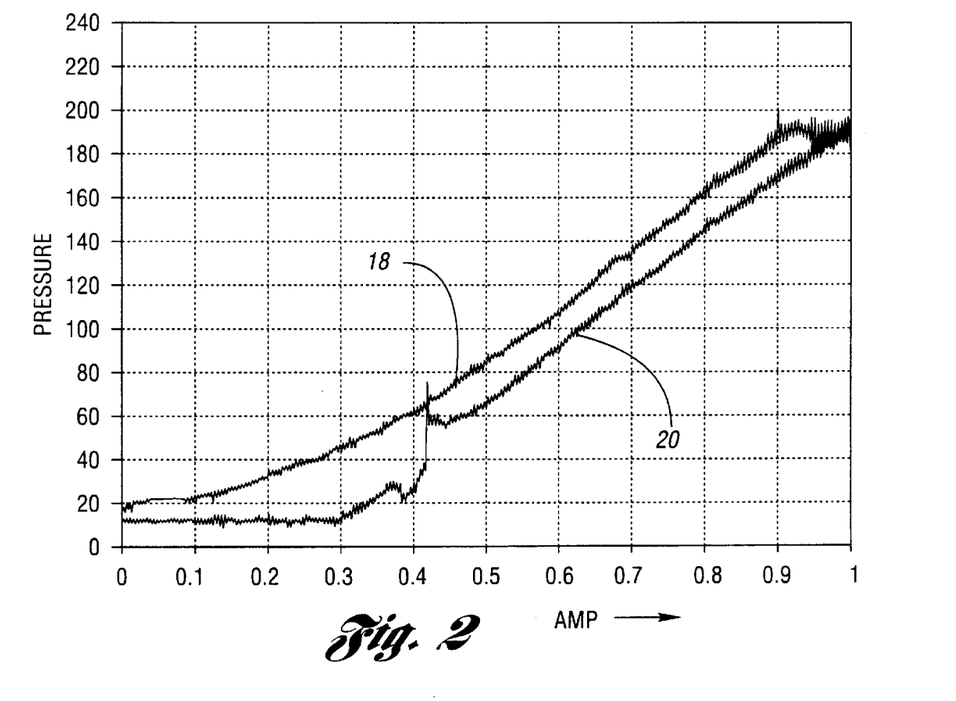
FIG. 2 is a plot of a transfer function for an electrohydraulic regulator in which the operating environment includes contaminated oil.

FIG. 2 shows the corresponding transfer function for an electrohydraulic regulator valve when the oil is contaminated with a known level of contaminants. In this instance, the transfer function that is produced as the current command is increasing is shown by the lower curve 20. As in the case of the transfer function of FIG. 1, a dither frequency is superimposed on the transfer function curve 20 of FIG. 2.

The transfer function characteristic that is apparent when command current decreases is shown by the upper curve 18 in FIG. 2. A gap exists between curves 18 and 20 due primarily to the friction caused by the contaminant.

Figures 3, 4:
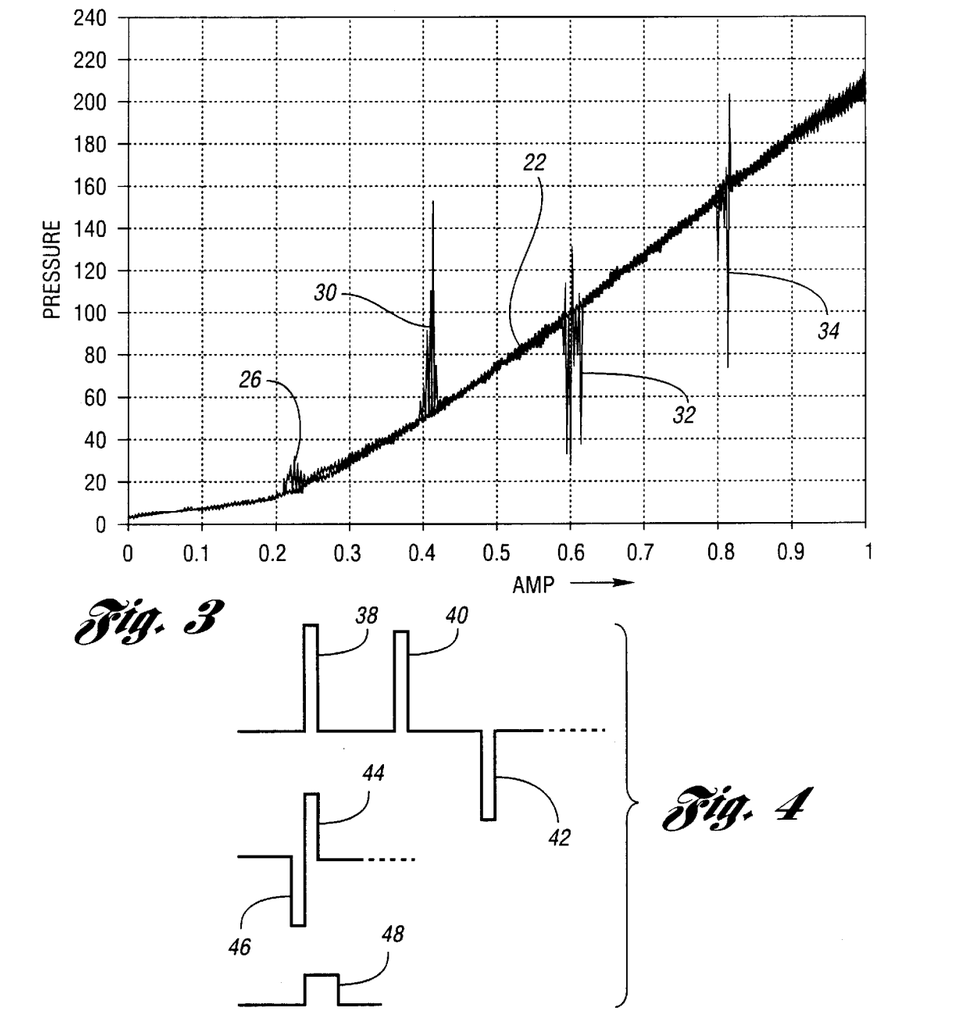
FIG. 3 is a plot of a transfer function in which the valve environment includes contaminated oil and wherein short cleaning pulses at periodic pulse cycles eliminate the hysteresis that is characteristic of the transfer function shown in FIG. 2.
FIG. 4 shows various cleaning pulses that may be used to effect a reduction or elimination of the mechanical friction element of hysteresis characteristic of the transfer function of FIG. 2.

FIG. 3 is a plot of a transfer characteristic for an electrohydraulic regulator valve when the oil contains a known level of contaminants. The environment of FIG. 3 corresponds to the environment of FIG. 2. In FIG. 3, however, cleaning cycles are superimposed on the transfer function curve 22. In the case of FIG. 3, a positive pulse is applied at the lower portion of the transfer function 22, as shown at 26. The direction of the pulse is positive. The pulse is of short duration and of controlled amplitude.

A delay period of about 4 seconds (0–1 amp sweep rate≈20 sec.) is followed by a second positive pulse, as shown at 30. The pulse width for pulses 26 and 30 are very short compared to the period illustrated in FIG. 3.

Additional pulses, in the case of FIG. 3, follow at uniform periods. An additional pulse, shown at 32, is applied in the negative direction. The pulse at 34 has amplitude, pulse width and direction corresponding to pulse 32.

Figure 3A:
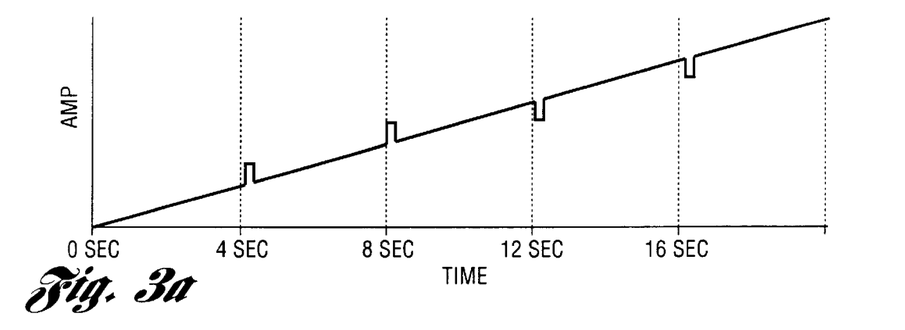
FIG. 3a is a plot of current versus time for the cleaning pulses of FIG. 3.

FIG. 3*a* shows the relationship of current and time for the transfer function of FIG. 3. Assuming that the current is swept every 20 seconds, the time periods for the pulses 26–34 of FIG. 3 are indicated in FIG. 3*a* as 4 seconds, 8 seconds, 12 seconds and 16 seconds, respectively.

FIG. 4 shows further pulse patterns. These include pulses that can be in the same direction, as shown at 38 and 40. In the case of the pulse pattern shown in FIG. 4, the pulses 38 and 40 may be followed by a single negative pulse 42. In the alternative, pulse 38 can be replaced by positive and negative pulses, as shown at 44 and 46, or by a reduced amplitude pulse with a relatively large pulse width as shown at 48. The pulse pattern, the pulse width, the pulse amplitude and the pulse periods are determined by a control algorithm that uses empirical data based on test results on hydraulic fluids with known levels of contamination. The algorithm effects a pulse pattern and a pulse characteristic expressed as a function of the level of contamination.

Figure 5:
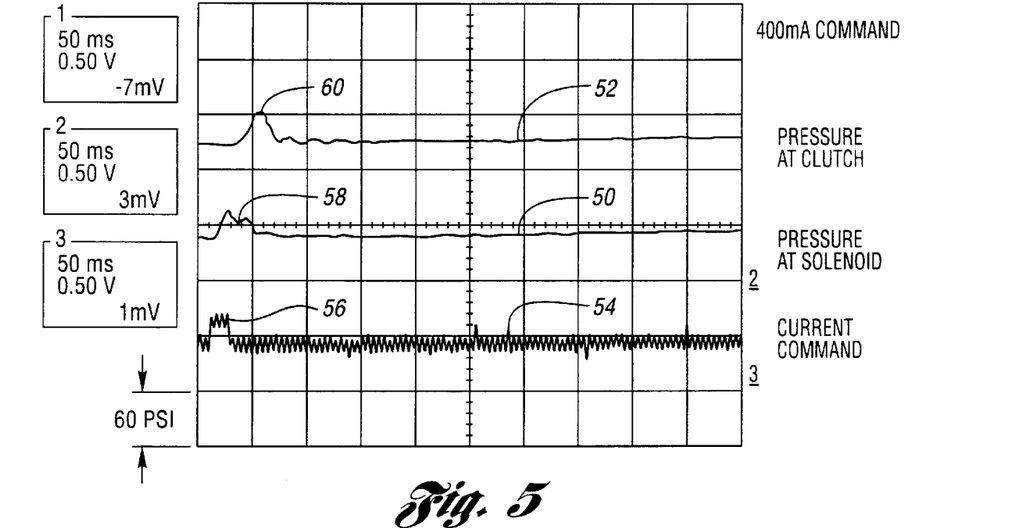
FIGS. 5, 6 and 7 are traces that represent the hydraulic response of a cleaning cycle in a clutch system for various command currents.
Figure 6:
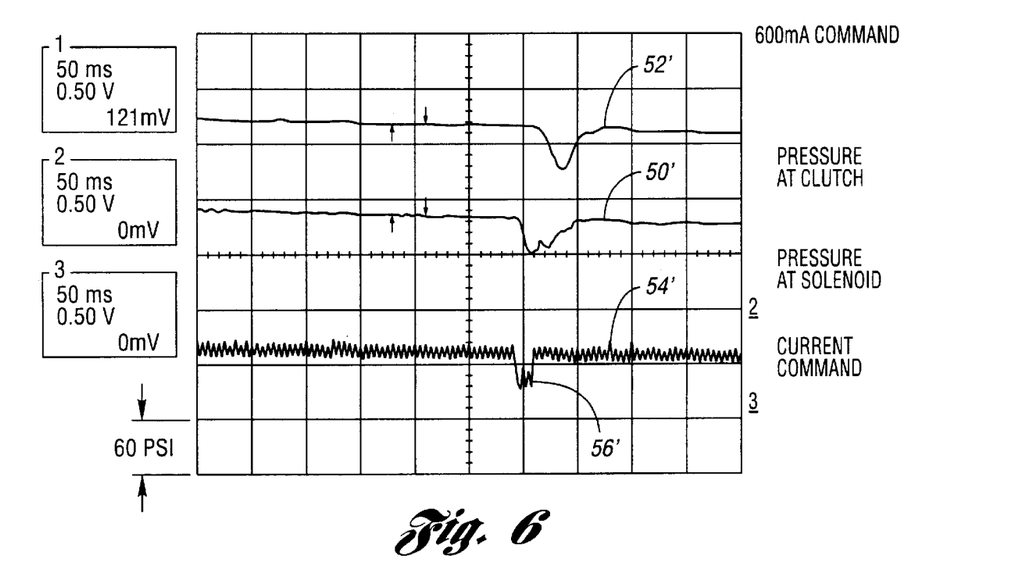
Figure 7:
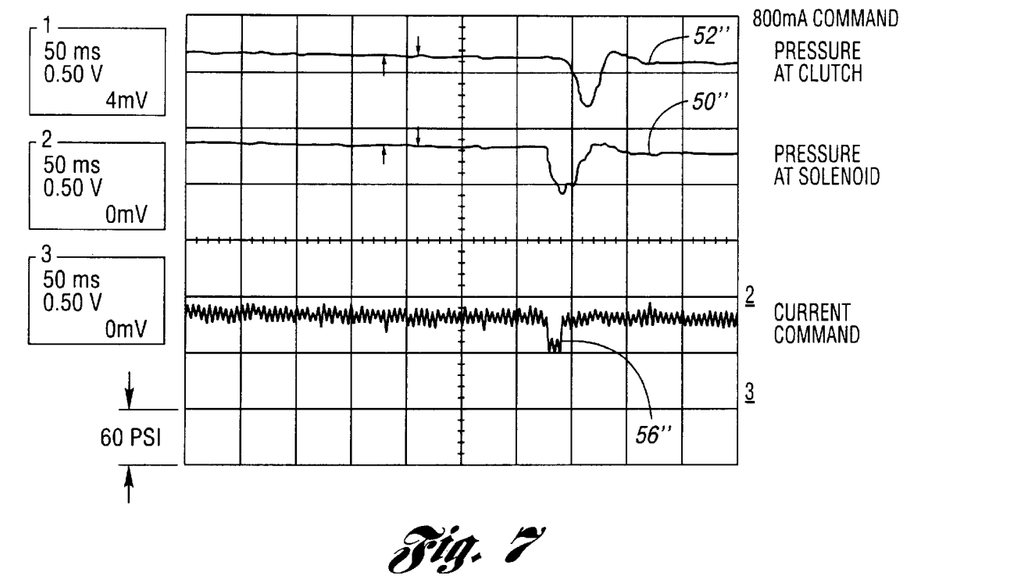

FIGS. 5, 6 and 7 show typical plots that illustrate the pressure at a clutch controlled by a hydraulic regulator valve that has an actuator circuit embodying the features of the invention. The pressure at the solenoid valve output port is shown in FIG. 5 at 50, and the corresponding pressure at the clutch or the brake controlled by the regulator valve is shown at 52. A cleaning pulse is superimposed on the command current 54, as shown at 56. The cleaning pulse 56 is in a positive direction and is of very short duration. The response of the pulse 56 effects a pressure pulse 58 for the solenoid and a pressure pulse 60 for the clutch or brake. The command current for the plot of FIG. 5 is 400 mA. A corresponding command current is used for the plots of FIGS. 6 and 7.

FIG. 6 has traces 54', 50' and 52' that correspond, respectively, to the traces at 54, 50 and 52 in FIG. 5. A pressure pulse 56' in FIG. 6 is applied in the negative direction rather than in the positive direction of pulse 56 in FIG. 5. The pulse 56' in the command current occurs at a different point in the operating cycle. The position of the pulse in the command current trace is another variable that may be introduced into the algorithm that describes the transfer function appropriate for a hydraulic fluid with a known degree of contamination.

A further example of a control pulse for the command current is shown in FIG. 7. The command pulse is illustrated at 56", and its effect on the pressure at the solenoid and the pressure at the clutch or brake is shown by the plots 50" and 52".

The current commanded for the plot of FIG. 6 is 600 mA, and the current commanded for the plot of FIG. 7 is 800 mA. The command current is determined by the requirements of the valve system. However, it may be used by the algorithm to define an appropriate cleaning pulse for a given level of contaminant.

Figure 8:
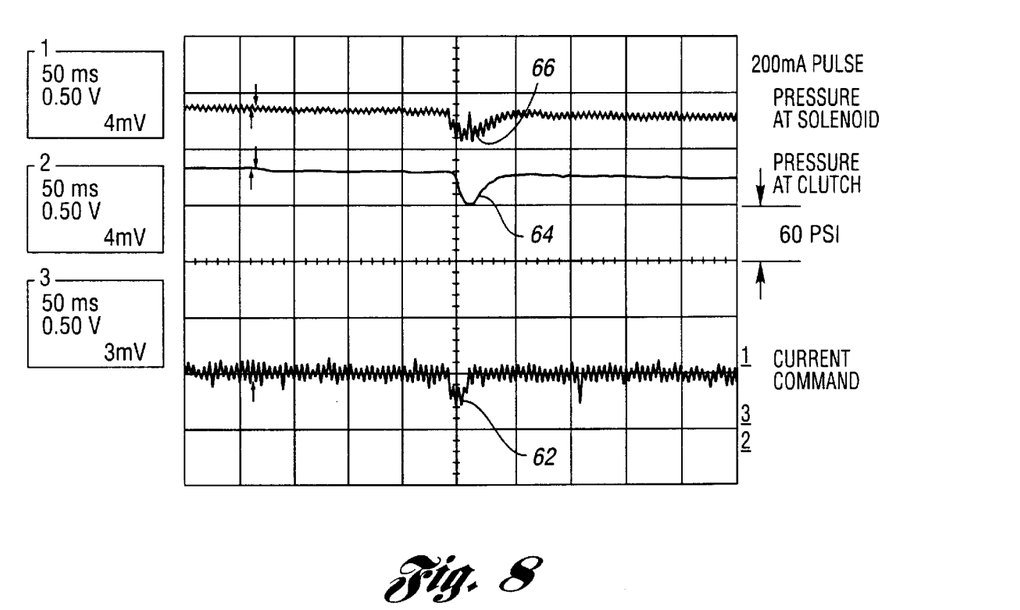
FIGS. 8, 9 and 10 are traces that illustrate the hydraulic response of an electrohydraulic valve to cleaning cycles for various pulse amplitudes.
Figure 9:
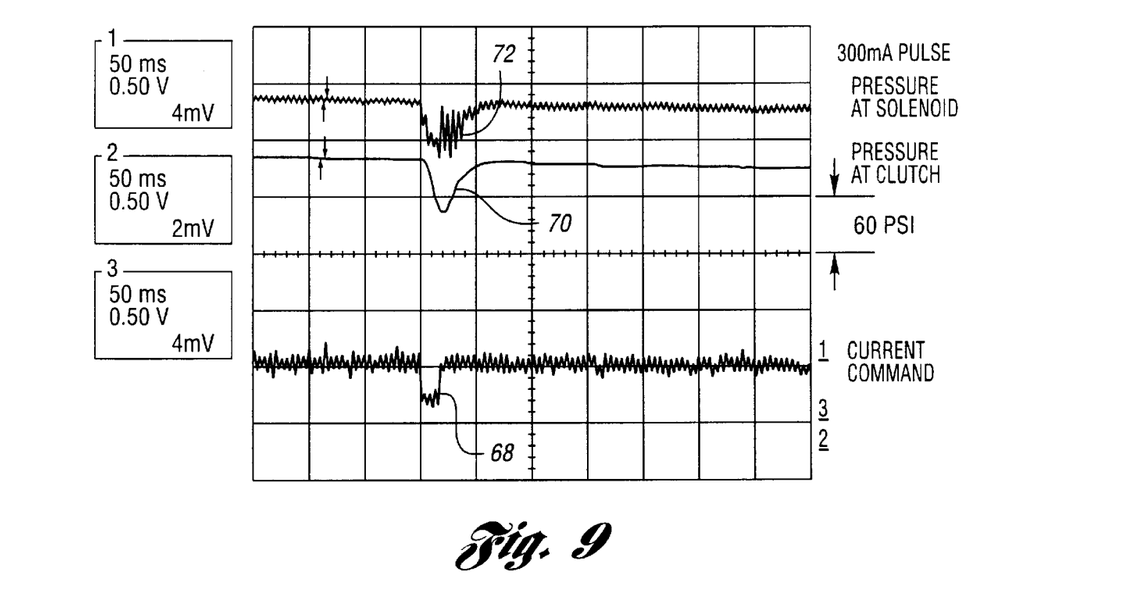
Figure 10:
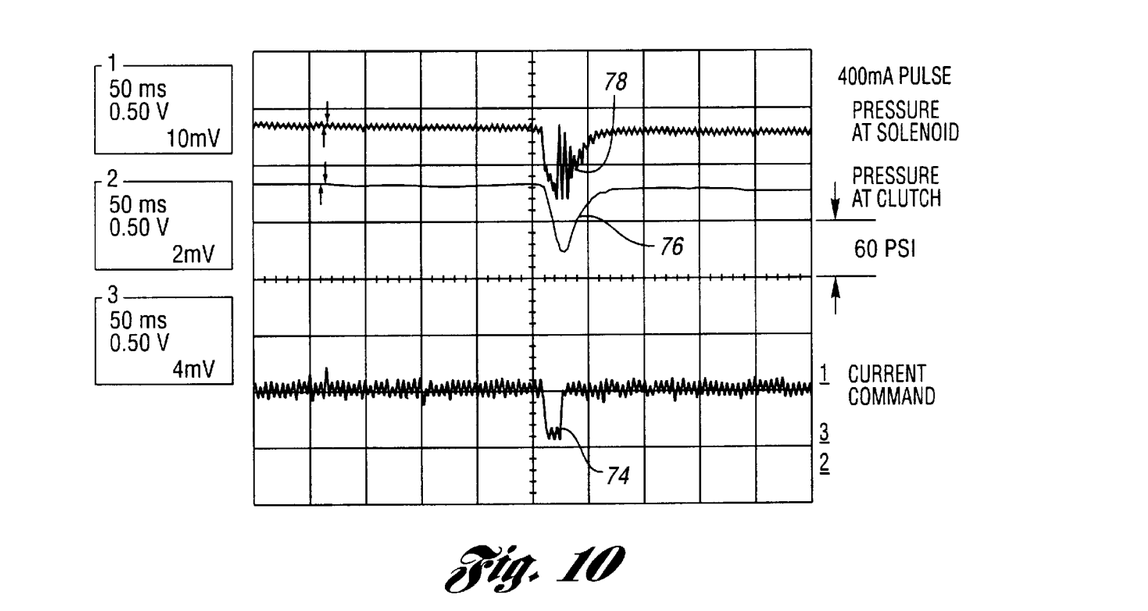

FIGS. 8, 9 and 10 show the characteristic plots for the hydraulic regulator valve when the current commanded is uniform. A 200 mA pulse, shown at 62 in FIG. 8, results in a pressure pulse at the clutch, as shown at 64, and a pressure pulse at the solenoid, as shown at 66.

FIG. 9 is a plot of the regulated pressure of a hydraulic regulator valve wherein a 300 mA pulse is applied to the current command, as shown at 68. The resulting pressure pulses at the clutch and at the solenoid are increased correspondingly relative to the pressure pulses 64 and 66. This is shown at 70 and 72, respectively.

FIG. 10 shows the regulated pressure of a hydraulic regulator valve in which a pulse of 400 mA is applied to the current command, as shown at 74. This results in pressure pulses at the clutch and at the solenoid, as shown at 76 and 78.

The characteristics shown in FIGS. 5–10 are merely representative. This should not be considered to limit the choices that are available to the electrohydraulic valve circuit designer in dealing with oil with varying degrees of contamination. The objective of the algorithm is to minimize the pressure disturbances in FIGS. 5–10, while maximizing the cleaning effect of FIG. 3.

Figure 11:
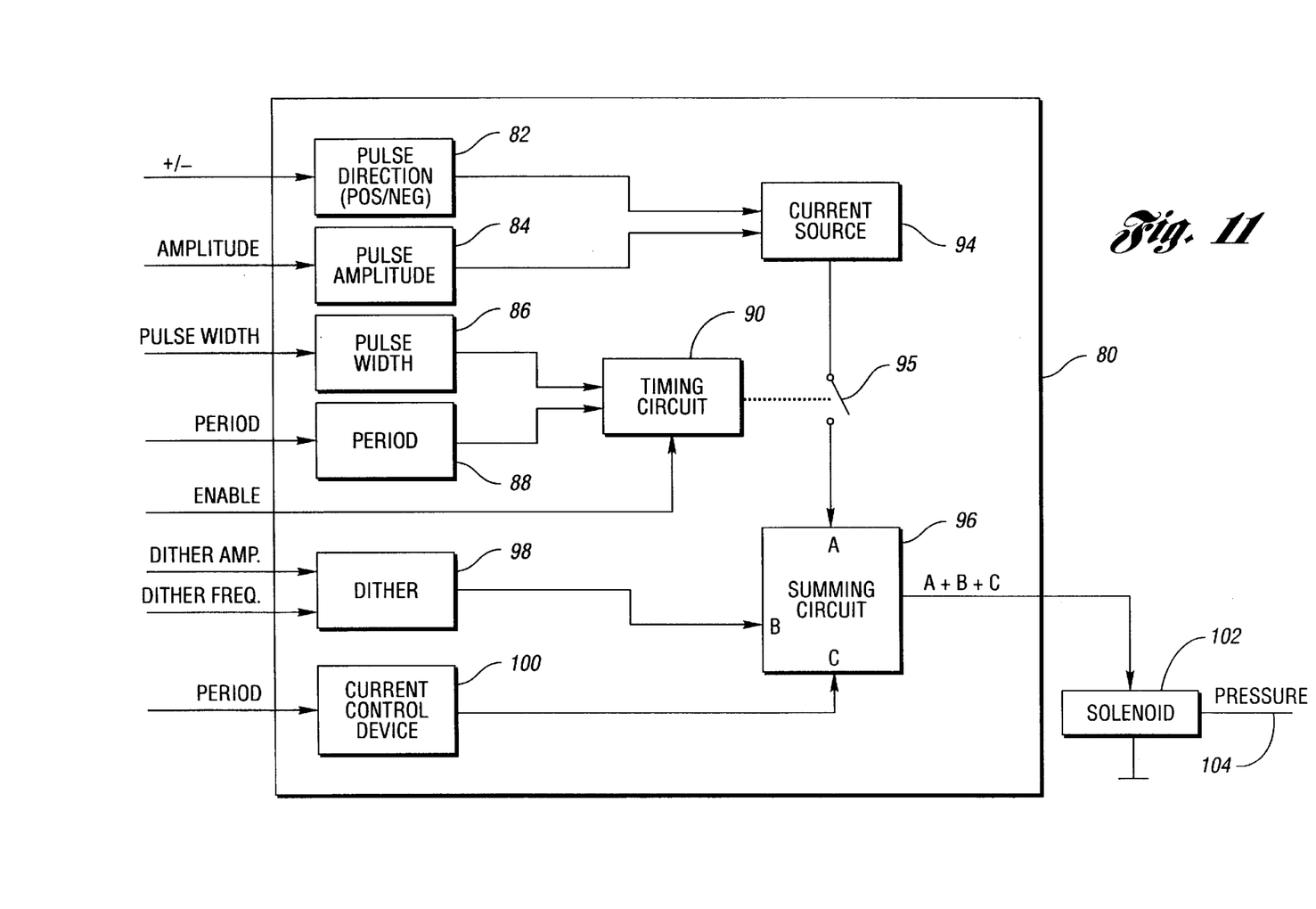
FIG. 11 is a schematic representation of a cleaning cycle driver circuit.

FIG. 11 shows a cleaning cycle driver circuit. The driver circuit may be part of an external controller in the case of an engine control for an automatic transmission control in an automotive vehicle driveline. The circuit of FIG. 11 may be a stand-alone processor where the characteristics of the cleaning pulses can be computed without burdening the central processor unit of the main controller for the engine or the transmission.

The cleaning cycle driver circuit controller is shown generally in schematic form at 80. It comprises a pulse direction subcircuit 82, which controls whether the pulse is in a positive or a negative direction. The amplitude of the pulse is established by a subcircuit 84. The pulse width and the pulse period are established by subcircuits 86 and 88, respectively. The outputs of the subcircuits 86 and 88 are delivered to a timing circuit 90 that controls a switch 95. The subcircuits 82 and 84 control the current source 94 and modify the amplitude and direction of the current source. The information made available by the subcircuits 82 and 84 for any given current command is made available to a summing circuit 96 by the switch 95.

A conventional dither subcircuit 98 and a current control device 100 deliver output values to the summing circuit 96. The amount of the current made available by the subcircuit 100 is determined by the performance requirements of the system.

The summing circuit 96 combines the outputs of the control current source 94, the dither current and the control current to produce an input current for the solenoid 102 of the solenoid valve. That establishes the output pressure at 104.

The subcircuit 84 defines the pulse width or duration during which the amplitude is added or subtracted from the command current. The subcircuit 88 defines a period of the pulse. The period can be overridden by the enable feature to generate a nonperiodic pulse controlled by the processor. The dither subcircuit 98 controls the dither amplitude and the dither frequency.

The timing circuit 90 closes the switch during the pulse width interval.

The cleaning cycle circuit of the invention allows separation of the cleaning cycle functions from the engine control functions or the transmission control functions of the automotive vehicle driveline when the invention is applied to a regulator valve in a driveline controller. Although the invention is adapted to be used in a driveline environment for an automotive vehicle, it may be used also in other environments such as a flow divider valve in a power steering circuit, for example, or in other pressureregulated valve systems in non-automotive vehicle control valve systems.

The same cleaning cycle circuit can be tuned so that optimum performance can be achieved for multiple solenoid designs. The pulse width, the amplitude, the pulse direction and the periods can be chosen in order to meet the requirements of a particular solenoid design. The undesirable effects of valve hysteresis illustrated in FIG. 2, for example, can be eliminated. The pulse amplitude and the pulse width can be controlled to produce a mechanical response of the valve without significantly affecting the pressure at the clutch or the brake that is controlled by the valve.

The invention makes it possible to limit the response of the hydraulic and mechanical elements of the control valve systems, such as a regulator valve spool. It does not overburden the central processor unit of the main controller in a driveline system, for example. The driver circuit computations that are necessary to produce a given cleaning pulse can take place by off-loading the computing steps.

The control algorithm relies upon empirical data as functional variables to produce a bidirectional pulse or a unidirectional pulse depending upon the output pressure command in relation to a threshold value. The cleaning cycle circuit, operating in accordance with the algorithm, will vary the pulse amplitude, the duration and the period to provide a mechanical movement of the valve itself without an excessive pressure change at the clutch or brake that is controlled by the valve.

Although a preferred embodiment of the invention has been described, it will be apparent to persons skilled in the art that modifications to the method and the circuit for establishing a cleaning cycle in a hydroelectric valve circuit can be made without departing from the scope of the invention. The following claims cover all such modifications and equivalents thereof.

What is claimed is:

1. A method for cleaning an electrohydraulic regulator valve in a control circuit having pressure operated control elements, the valve operating in contaminated fluid, applying a command current to the regulator valve to effect a controlled response of the control elements as determined by a given transfer function for the regulator valve;

applying at least one current pulse to the command current and establishing the pulse direction;

controlling the pulse width to effect an instantaneous response of the valve without adversely affecting the regulating function of the pressure applied to the control elements; and controlling the amplitude of the pulse whereby the control capacity of the control elements is not adversely affected;

the pulse width and amplitude being empirically determined during calibration from transfer function results that indicate robust performance whereby contaminants are passed through the valve due to fluid flow through the valve to effect a predictable mechanical response of the valve to changes in command current, the calibration being in accordance with a predetermined level of contamination of the fluid.

2. The method set forth in claim 1 wherein successive current pulses are applied to the command current; and controlling the pulse period in accordance with the degree of contamination of the fluid.

3. The method set forth in claim 1 wherein pulse width, pulse direction and pulse amplitude are controlled as a function of the degree of contamination of the fluid.

4. The method set forth in claim 2 wherein pulse width, pulse direction and pulse amplitude are controlled in accordance with the degree of contamination of the fluid.

5. A cleaning cycle driver circuit for an electrohydraulic regulator valve in a control valve system having pressure-operated control elements, the regulator valve having a solenoid actuator for controlling hydraulic fluid flow therethrough;

a source of electric current for the driver circuit for effecting a controlled response of the regulator valve as determined by a given transfer function;

a current pulse generator subcircuit connected to the current source;

a pulse direction control subcircuit connected to the current source;

a pulse width control subcircuit and a pulse period control:

the pulse width, amplitude, direction and period being empirically determined during calibration from transfer function results that indicate robust performance, said calibration being in accordance with a predetermined level of contamination of the fluid;

a timing circuit connected to the pulse width control and the pulse period control, the timing circuit means responding to output signal values of the pulse period control and the pulse width control to connect and disconnect alternately the current source and the solenoid actuator;

the current pulse applied to the commanded current for the solenoid actuator effecting a controlled response of the regulator valve whereby frictional resistance to movement of the regulator due to the hydraulic contamination is overcome as hydraulic fluid flows through the regulator valve.

6. The driver circuit as set forth in claim 5 wherein the driver circuit includes a processor portion including means for determining pulse width, pulse amplitude and direction and pulse period in accordance with empirical data indicating the degree of contamination for hydraulic fluid used in the valve system.

* * * * *